March 8, 1938.　　　　H. E. TAUTZ　　　　2,110,537
DRILL PRESS ADJUSTMENT
Filed June 3, 1936
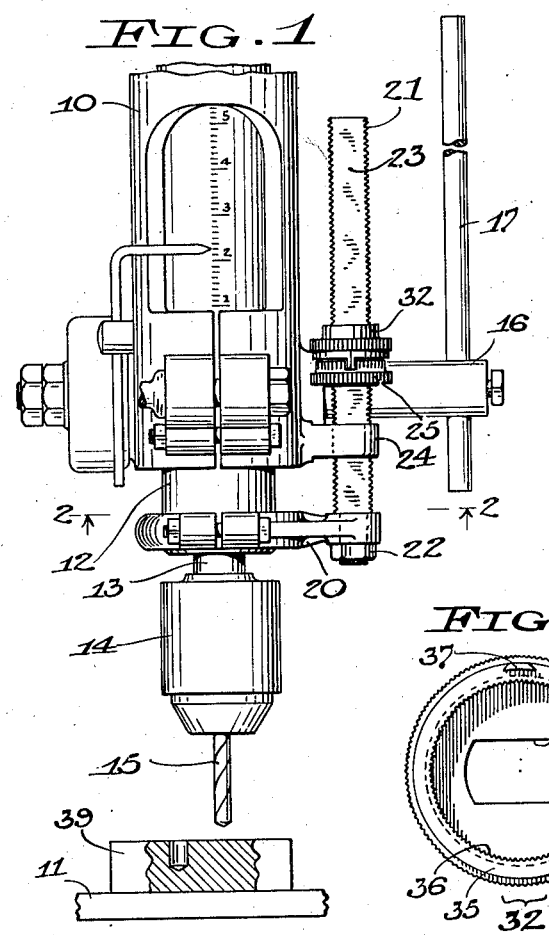
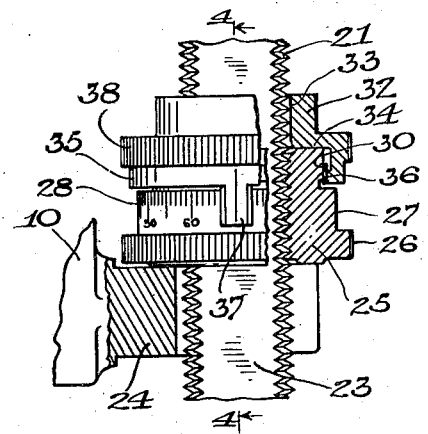
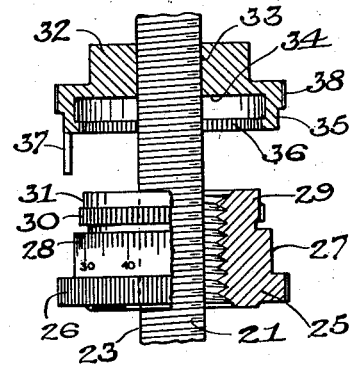
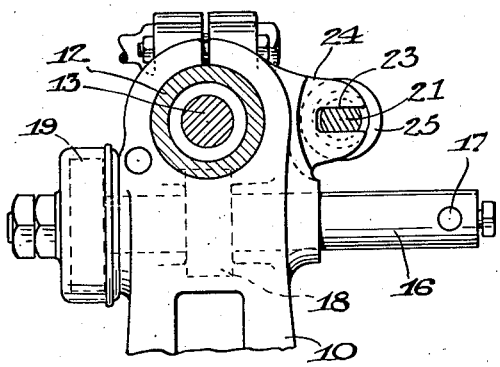
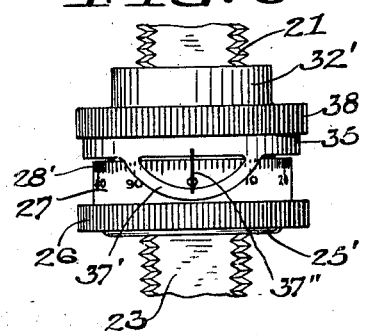
WITNESSES
L. E. Kilian
C. L. Waal
INVENTOR
Herbert E. Tautz,
By R. C. Caldwell
ATTORNEY Patented Mar. 8, 1938

2,110,537

UNITED STATES PATENT OFFICE 2,110,537

DRILL PRESS ADJUSTMENT

Herbert E. Tautz, Milwaukee, Wis., assignor to The Delta Manufacturing Company, Milwaukee, Wis., a corporation of Wisconsin Application June 3, 1936, Serial No. 83,254

7 Claims. (Cl. 77—33)

The invention relates to adjustments for drill-presses and other machine tools, and has for an object the provision of an improved micrometer cutting-depth adjustment which is of simple, durable and inexpensive construction and which is capable of easy manipulation.

Another object of the invention is to perfect details of construction generally.

The invention further consists in the several features hereinafter described and claimed.

In the accompanying drawing, illustrating certain embodiments of the invention,

Fig. 1 is a front elevation of a drill-press having a micrometer depth stop embodying the invention, parts being broken away and parts being shown in section;

Fig. 2 is a sectional view taken on the line 2—2 of Fig. 1;

Fig. 3 is a detail elevation of the stop in stopping position, parts being broken away and parts being shown in section;

Fig. 4 is a sectional view taken generally along the line 4—4 of Fig. 3, but with the parts in a different position ready for adjustment;

Fig. 5 is a bottom view of a locking member for the stop, and

Fig. 6 is an elevation of a modified form of stop.

In the drawing, 10 designates a drill-press head mounted over a work-supporting table 11. A vertical quill 12 is slidably mounted in the head 10 and has journalled therein a spindle 13, here shown to carry a chuck 14 for a drill 15. The spindle-carrying quill is reciprocated in any suitable manner, as by means of a horizontal shaft 16 journalled in the head 10 and carrying a handle 17, the shaft having the usual rack-and-pinion connection 18 with the quill. The quill may be suitably counterbalanced, as by means of a spiral torsion spring 19 on the shaft 16.

An arm 20 is clamped about the lower end of the quill and has an apertured outer end which carries an upstanding stop rod 21 extending parallel to the quill axis, the rod having a reduced lower end which passes through the arm and is clamped thereto by a nut 22. The rod 21 is screw-threaded and is cut away at opposite sides to form flat parallel faces 23. The flattened rod 21 loosely fits in a forked projection 24 formed on the head 10, the plane of the flat upper face of the projection being at right angles to the axis of the rod.

A stop nut 25, shown in detail in Figs. 3 and 4, is threaded on the rod 21 and has a knurled peripheral flange 26 at its lower end. Above the flange is a cylindrical face 27 which is engraved to form a scale 28 thereabout with equally spaced divisions, and above the scale is a reduced cylindrical portion 29 which carries a peripheral band of serrations, splines, or key projections 30 extending parallel to the nut axis. The serrations are preferably spaced from the upper end of the nut so as to present a cylindrical guide surface 31, the diameter of the guide surface being about equal to the root diameter of the serrations. The number of serrations is equal to, or a multiple of, the number of divisions of the scale 28.

The stop nut 25 is releasably locked in angularly adjusted position by a superposed locking member 32 which is slidable on the rod but is prevented from rotating on the rod, the locking member having a parallel-sided opening 33 in which the flattened rod slidably fits, and having a flat face 34 to rest on the flat upper end of the nut 25. The locking member has a downwardly projecting skirt 35 which fits over the cylindrical upper portion 29 of the nut 25 and is provided with one or more internal serrations 36, preferably a band thereof, to interengage or mesh with the serrations 30 on the nut. The skirt 35 has a downwardly projecting index finger 37 which cooperates with the scale 28 on the nut. The finger has beveled sides and is equal in width to a whole number of scale divisions, so that either of the parallel side edges of the finger may be used as a reference mark. The locking member has a peripheral knurled flange 38 to form a finger hold.

The screw-thread on the stop rod 21 is preferably fairly coarse, say ten threads to the inch, so that the stop nut 25, when released from the locking member, may be spun rapidly to the desired position, use being made of the fly-wheel effect of the nut. The coarse thread also provides strength and durability. With ten threads to the inch on the nut, the number of scale divisions on the nut is preferably one hundred, so that each scale division will represent one one-thousandth of an inch of axial movement of the nut on the rod.

In operation, a work piece 39 is placed on the drill-press table 11, and the stop nut 25 is adjusted on the stop rod 21 to the approximate position desired. To effect adjustment of the stop nut the locking member 32 is lifted from the nut with one hand and the nut is turned or spun with the same hand or the other hand to the desired position, whereupon the locking member 32 is lowered onto and over the nut to prevent further rotation of the nut, the serrations 36 on the locking member meshing with the serrations 30 on the nut. In effecting the meshing, the serrations 36 on the locking member are guided by the cylindrical surface 31 on the upper end of the nut. The locking member is held by gravity in locking position. The operator then determines the correction to be made in the depth of cut, and the stop nut is readjusted up or down the required number of thousandths of an inch. The drilling depth will then be maintained for the holes to be drilled, and will be determined by the engagement of the stop nut with the forked projection 24 on the drill-press head, the projection 24 forming a stop abutment. For certain kinds of work it may be necessary to drill different holes to depths which differ by a predetermined amount, say five one-thousandths of an inch. In such case, after one hole is drilled, it is only necessary to turn the stop nut in the proper direction through five scale divisions to accurately obtain the desired setting for the second hole, the locking member being lifted from the nut to permit the angular displacement of the nut. The amount of lift of the locking member need only be sufficient to release the serrations 36 from the serrations 30 of the stop nut, the serrations 36 being in slidable contact with the cylindrical guide surface 31 of the nut, and the index finger 37 remaining adjacent the scale 28.

In the modified form of adjustment shown in Fig. 6, the stop rod 21 has threaded thereon a stop nut 25' which is identical with the nut 25 except that the engraved scale 28' may be slightly altered. The locking member 32' is identical with the locking member 32 except that the finger 37 is replaced by an open window 37' having therein a thin metal index strip 37" which extends vertically and is fastened at one end or both ends. The device of Fig. 6 is operated in the same manner as the device of Figs. 1 to 5.

The micrometer adjustment of the invention may also be used in connection with various other tool operations, such as routing, grinding and spot-facing.

What I claim as new and desire to secure by Letters Patent is:

1. The combination, with a machine tool having a reciprocatory part for bringing a tool relatively against the work, of a screw-threaded rod connected to said reciprocatory part and movable longitudinally, a stop abutment, a stop member screw-threaded on said rod to engage said stop abutment for limiting the advancing travel of said reciprocatory part, and a locking member slidably but non-rotatably fitting on said rod and releasably interengageable with said stop member to lock said stop member in axially adjusted position on said rod, said locking member being slidable axially into and out of locking position, one of said members having a scale thereabout, and the other member having an index to cooperate with said scale.

2. A micrometer stop for a machine tool, comprising a stop abutment, a screw-threaded rod relatively movable with respect to said abutment, a stop member screw-threaded on said rod and engageable with said abutment to limit relative movement between said rod and said abutment, and a locking member slidably but non-rotatably fitting on said rod and releasably interengageable with said stop member to lock said stop member in axially adjusted position on said rod, said locking member being slidable axially into and out of locking position, one of said members having a scale thereabout, and the other member having an index to cooperate with said scale.

3. A micrometer stop adjustment for a machine tool, comprising a screw-threaded rod, a member screw-threaded on said rod, and a locking member slidably but non-rotatably fitting on said rod and releasably interengageable with said screw-threaded member to lock said screw-threaded member in axially adjusted position on said rod, said locking member being slidable axially into and out of locking position, one of said members having a scale thereabout, and the other member having an index to cooperate with said scale.

4. A micrometer stop adjustment for a machine tool, comprising a screw-threaded rod, a member screw-threaded on said rod, and a locking member slidably but non-rotatably fitting on said rod, said members being respectively externally and internally serrated to form key projections releasably interengageable for locking said screw-threaded member in axially adjusted position on said rod, said locking member being slidable axially into and out of locking position.

5. A micrometer stop adjustment for a machine tool, comprising a screw-threaded rod, a member screw-threaded on said rod, and a locking member slidably but non-rotatably fitting on said rod, said members being respectively externally and internally serrated to form key projections releasably interengageable for locking said screw-threaded member in axially adjusted position on said rod, said locking member being slidable axially into and out of locking position, one of said members having a substantially cylindrical guide surface engageable with the key projections on the other member.

6. A micrometer stop adjustment for a machine tool, comprising a screw-threaded rod, an externally serrated member screw-threaded on said rod and having thereabout a scale, and a locking member slidably but non-rotatably fitting on said rod and having a skirt portion to fit over said screw-threaded member, said skirt portion having an index to cooperate with said scale and being internally serrated to releasably interengage with said externally serrated screw-threaded member for locking said screw-threaded member in axially adjusted position on said rod, said locking member being slidable axially into and out of locking position.

7. A micrometer stop adjustment for a machine tool, comprising a stop abutment, a screw-threaded rod, a stop member screw-threaded on said rod and freely rotatable thereon to different axially adjusted positions, said stop member being engageable with said abutment to limit relative movement between said rod and abutment, and a locking member slidably but non-rotatably fitting on said rod and releasably interengageable with said stop member to lock said stop member in axially adjusted position, said locking member being slidable axially on said rod into and out of locking position and when out of locking position permitting said stop member to be spun on said screw-threaded rod to different axially adjusted positions, one of said members having a scale thereabout, and the other member having an index to cooperate with said scale.

HERBERT E. TAUTZ.